(No Model.)
G. P. DAVIS.
VALVE.
No. 536,854. Patented Apr. 2, 1895.
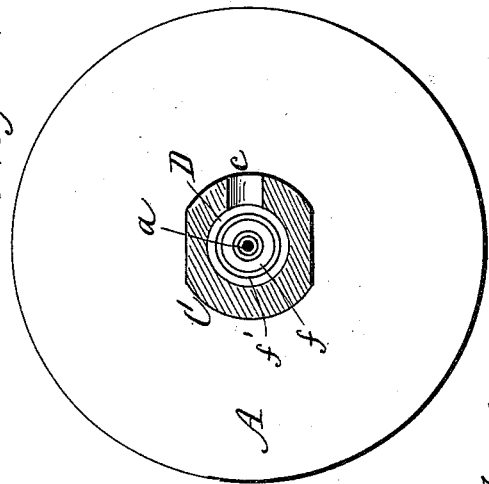
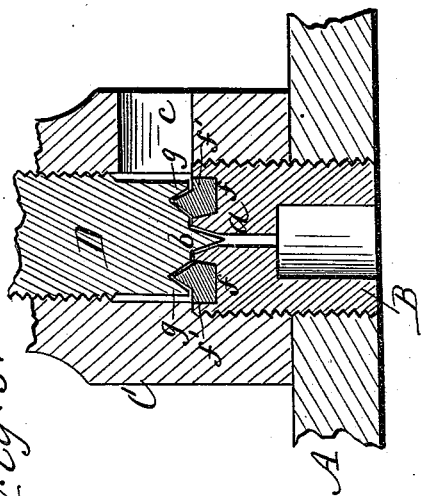
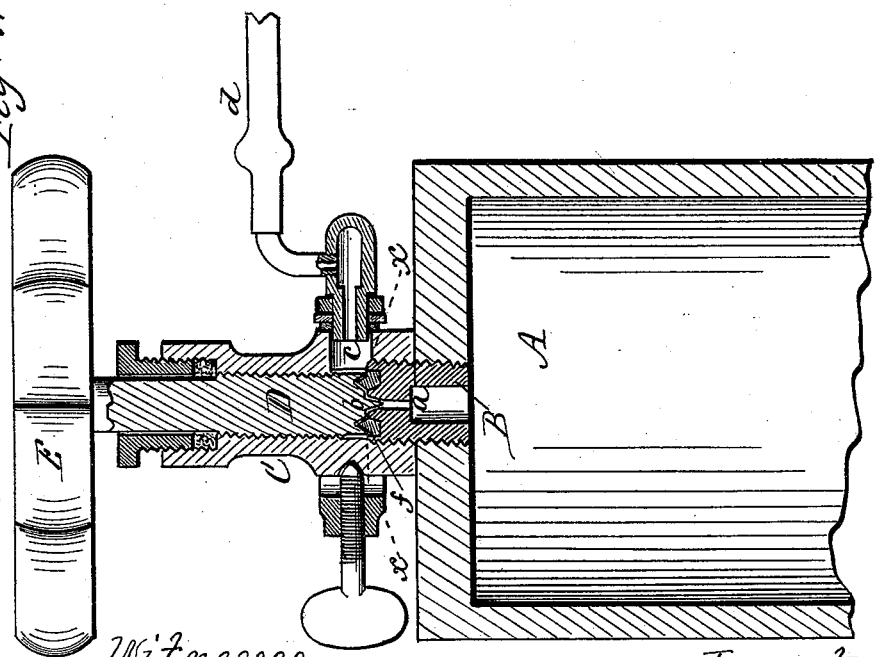
Witnesses.
C. R. Osgood
F. S. Hutchinson
Inventor.
Geo. P. Davis.
per R. F. Osgood
Atty

UNITED STATES PATENT OFFICE.

GEORGE P. DAVIS, OF ROCHESTER, NEW YORK.

VALVE.

SPECIFICATION forming part of Letters Patent No. 536,854, dated April 2, 1895.

Application filed May 9, 1894. Serial No. 510,623. (No model.)

*To all whom it may concern:*

Be it known that I, GEORGE P. DAVIS, of Rochester, in the county of Monroe and State of New York, have invented a certain new and useful Improvement in Valves; and I do hereby declare that the following is a full, clear, and exact description of the same, reference being had to the drawings accompanying this specification.

My improvement relates to valves for confining and regulating the escape of highly compressed gases and other fluids, and is of that kind where the plug is provided with a conical or tapering stem which fits in a correspondingly shaped seat. When fully closed the tapering stem cuts off the flow of gas, and when opened to a greater or less degree it regulates the flow to a given quantity.

In some cases, especially the holding of nitrous oxide gases, the pressure is very great, sometimes exceeding one thousand pounds per square inch; and it has been found difficult to so accurately fit the metallic screw plug and its tapering valve stem as to make a tight joint. It is the object of my invention to remedy this difficulty, and it consists in the employment of a supplementary packing consisting of a ring of hard rubber or equivalent material of peculiar construction, located outside of the tapering stem, and a peculiar construction of the end of the plug to fit and inclose the packing, all as hereinafter more fully described and embodied in the claims.

In the drawings—Figure 1 is a central, vertical section of the device attached to a cylinder which contains the gas. Fig. 2 is a cross section of the same in line $x\,x$ of Fig. 1. Fig. 3 is an enlarged vertical section of the valve portion.

A indicates a cylinder or receptacle in which the gas or other fluid is stored.

B is a nozzle screwed therein, forming the valve seat, and provided with a passage $a$ tapering at its upper end and forming a seat to receive the tapering valve stem.

C is the valve case screwed on the upper end of the nozzle, and D is the screw plug screwing inside the casing and provided at its lower end with a tapering valve stem $b$, which enters the tapering seat of the passage $a$. When the plug is fully screwed down the tapering stem closes the passage and cuts off the flow of gas. When raised more or less it allows escape of the gas and regulates its flow as in other apparatus of the kind. The gas escapes through a side passage $c$ into a discharge tube $d$. The screw plug is operated by a hand wheel E, or by any suitable wrench. I supplement the tapering metallic valve thus constructed with a ring $f$, of hard rubber, or equivalent material, of $\wedge$-shape in cross section, which is set into a groove in the top of the nozzle, but is of such size that it comes within the diameter of the end of the screw plug. When the screw plug is forced down to close the valve the rubber packing is inclosed, the outer edge $g$ of the plug resting outside of it. In this condition the rubber ring is forcibly compressed and has no escape however great may be the pressure, and fills all the space of the groove of the plug which incloses it, and forms a perfect packing independent of the metallic valve. The outer edge of the rubber ring has, however, an offset $f'$, around which the edge $g$ of the plug strikes, whereby the pressure on the rubber packing is not limited or stopped till the tapering stem $b$ has been fully seated in place. The end of the plug is grooved to properly fit and receive the rubber packing.

By the means above described the gas vent is more securely sealed than by the use of the metallic valve alone. It has been found very difficult to tightly close the vent by the use of the metallic tapering stem alone, owing to imperfections in its surface, as well as the difficulty of maintaining the true vertical position of the screw plug in running down. Where the internal pressure is excessive the leakage is great and the source of much trouble, especially in holding nitrous oxide, the escape of which is not readily detected. The difficulty is increased by long use. The rubber packing obviates it. Such leakage as passes the metallic valve is arrested by the rubber packing, and as the pressure at the joint after passing the valve stem is slight, the rubber maintains its form, especially when inclosed in the manner described.

Having described my invention, what I claim as new, and desire to secure by Letters Patent, is—

1. In a gas valve, the combination, with the screw plug D, provided with the tapering stem $b$ shutting into a correspondingly tapering seat, of the rubber ring $f$ surrounding the vent passage and inclosed by the end of the screw plug, said ring forming a packing supplementary to the metallic valve, as and for the purpose specified.

2. In a gas valve, the combination of the nozzle B provided with the vent passage $a$, the screw plug D provided with the tapering valve stem $b$ shutting into the tapering seat, and the rubber ring $f$ set into a groove in the top of the nozzle, said ring being inclosed by the end of the plug and provided with an offset $f_1'$ around which the outer edge of the plug strikes, as and for the purpose specified.

In witness whereof I have hereunto signed my name in the presence of two subscribing witnesses.

GEO. P. DAVIS.

Witnesses:
R. F. OSGOOD,
CHAS. A. WIDENER.